(12) United States Patent
Huber

(10) Patent No.: US 7,207,407 B2
(45) Date of Patent: Apr. 24, 2007

(54) QUICK DISCONNECT SUPPORT BRACKET FOR A WHEELED VEHICLE

(76) Inventor: Hartmut Huber, 2633 Lantana Rd., #19, Lantana, FL (US) 33462

( * ) Notice: Subject to any disclaimer, the term of this patent is extended or adjusted under 35 U.S.C. 154(b) by 41 days.

(21) Appl. No.: 10/908,155

(22) Filed: Apr. 29, 2005

(65) Prior Publication Data

US 2006/0243507 A1    Nov. 2, 2006

(51) Int. Cl.
*B62D 61/00* (2006.01)
(52) U.S. Cl. .................. 180/208; 280/62; 280/639; 280/642
(58) Field of Classification Search .......... 280/87.042, 280/87.041, 87.05, 639, 642, 62, 47.34; 180/208
See application file for complete search history.

(56) References Cited

U.S. PATENT DOCUMENTS

| | | | |
|---|---|---|---|
| 3,093,295 A * | 6/1963 | Kugler ..................... 383/203 |
| 4,087,107 A * | 5/1978 | Winchell ................... 280/220 |
| 4,087,108 A * | 5/1978 | Winchell ................... 280/221 |
| 4,088,338 A * | 5/1978 | Winchell et al. ........... 280/220 |
| 4,408,776 A | 10/1983 | Randolph et al. |
| 4,438,942 A | 3/1984 | Hon |
| 4,457,529 A | 7/1984 | Shamie et al. |
| 4,526,390 A * | 7/1985 | Skolnik ................. 280/87.041 |
| 4,540,192 A * | 9/1985 | Shelton ..................... 280/282 |
| RE32,681 E | 5/1988 | Randolph et al. |
| 4,757,868 A | 7/1988 | Cresswell |
| 4,947,955 A | 8/1990 | Hopely, Jr. |
| 5,129,665 A | 7/1992 | Sutter et al. |
| 5,145,196 A | 9/1992 | Langkamp |
| 5,150,762 A | 9/1992 | Stegeman et al. |
| 5,318,144 A | 6/1994 | Berlinger, Jr. |
| 5,328,193 A * | 7/1994 | Shiew .................. 280/87.041 |
| 6,036,220 A | 3/2000 | Zhen |
| 6,220,612 B1 | 4/2001 | Beleski, Jr. |
| 6,367,824 B1 | 4/2002 | Hayashi |
| 6,467,781 B1 * | 10/2002 | Feng ......................... 20/87.01 |
| 6,517,093 B2 | 2/2003 | Feng |
| 6,685,206 B1 | 2/2004 | Blake |
| 6,883,814 B2 * | 4/2005 | Chuang ................. 280/87.041 |
| 6,908,091 B2 * | 6/2005 | Chuang ................. 280/87.041 |
| 7,055,841 B2 * | 6/2006 | Buhrman .................... 280/263 |
| 2005/0077097 A1 * | 4/2005 | Kosco et al. ................ 180/208 |

* cited by examiner

*Primary Examiner*—David R. Dunn
*Assistant Examiner*—Toan C. To
(74) *Attorney, Agent, or Firm*—John C. Smith

(57) ABSTRACT

A collapsible three wheeled vehicle for personal transportation which has a removable support bracket that secures the distal ends of two independent foldable side rails at either end of the support bracket. The support bracket also provides a mounting base for a passenger seat. The rear support bracket, when removed, allows the side rails to fold together with the steering column for convenient storage. A removable front wheel, a removable seat, and removable steering handles allow the vehicle to further reduce the required amount of space for storage and transport. The vehicle uses a battery operated electric drive motor. A second optional battery power supply may be attached to the vehicle to extend its range. A storage bag is provided to hold the components of the vehicle when not in use.

20 Claims, 13 Drawing Sheets

QUICK DISCONNECT SUPPORT BRACKET FOR A WHEELED VEHICLE

BACKGROUND OF THE INVENTION

1. Technical Field

The present invention relates to collapsible three wheeled vehicles. In particular, it relates to a quick disconnect support bracket for three wheeled vehicles which provides a stable connection for opposing wheels, a stable mounting platform for battery power supplies, and a secure mounting base for a seat.

2. Background

A large number of people in society are afflicted with variety of physical conditions which make it difficult for them to walk. Originally, the only way for them to get about was through the use of crutches or wheelchairs. Unfortunately, both of these methods require a substantial amount of physical effort on the part of the individual.

One attempt to alleviate this problem has been the development of motorized wheelchairs. These motorized wheelchairs typically use battery powered electric motors which are controlled by electrical switches operated by the individual in the wheelchair. While these chairs allow a disabled individual to travel and take care of daily chores, they have several limitations. One limitation is related to cost. These devices are typically built using a conventional wheelchair which is modified to include a motor assembly, a power supply, and control and brake assemblies. A conventional manually operated wheelchair is relatively expensive by itself. The addition of all the equipment and components required to motorize a conventional wheelchair further increases its cost. In addition, a labor necessary to make modifications adds another layer of cost to a motorized wheelchair. It would be desirable to have a powered vehicle which could be produced inexpensively.

A second problem associated with conventional wheelchairs is that they are fairly cumbersome and difficult to transport or store when they are not being used. For example, even when folded up they are typically too bulky to fit within the trunks of many cars. Likewise, they are even less likely to fit within the rear seat of the vehicle. As a result, this has led to the development of expensive rack mounting systems for automobiles which are designed to secure the wheelchair on the rear bumper of the automobile. This not only increases costs for the individual, but it also increases the amount of work required by the individual when traveling, and detracts from the appearance of the automobile. While these problems exist for conventional wheelchairs, they are exacerbated by motorized wheelchairs because of the additional bulk and weight associated with the power drive system. It would be desirable to have a powered vehicle which could be conveniently transported from one place to another.

Another problem associated with conventional wheelchairs is related to storage when the wheelchair is not in use. When the individual using a wheelchair arrives at a particular destination, and the wheelchair is temporarily not needed, the wheelchair will typically be stored until needed again. This creates a storage problem because, even when folded, wheelchairs require a substantial amount of storage space. It would be desirable to have a wheelchair that can be conveniently stored in a minimal amount of space.

More recently, the powered chair has been developed as an alternative to motorized wheelchairs. The powered chair is typically a powered tricycle using a steerable front wheel with a steering wheel assembly. The power drive would typically be connected to one or both of the two rear wheels. Powered chairs are permanently assembled and typically do not fold for transport. Powered chairs are typically heavier and more expensive than motorized wheelchairs. As a result, they have all of the disadvantages of a motorized wheelchair. It would be desirable to have a vehicle which could be driven in a fashion similar to a powered chair, but which could be manufactured inexpensively, which could be easily transported, and which could be easily stored.

While the prior art has provided mobility for numerous disabled individuals, it has not been able to provide a personal vehicle for disabled individuals which is lightweight, is inexpensive to manufacture, and which can be folded into a compact package when not in use so that it is easy to transport and store.

SUMMARY OF THE INVENTION

The present invention provides a three wheeled vehicle for personal transportation which has a removable rear support bracket that secures two independent foldable side rails at either end of the support bracket, and which also provides a mounting base for a passenger seat. The rear support bracket, when removed, allows the side rails to fold together with the steering column for convenient storage. A removable front wheel, a removable seat, and removable steering handles allow the vehicle to further reduce the required amount of space for storage and transport. The vehicle also has electric drive motor and battery power supply. A second optional battery may be attached to the vehicle to extend its range.

DESCRIPTION OF THE PREFERRED EMBODIMENT

Figure 1:
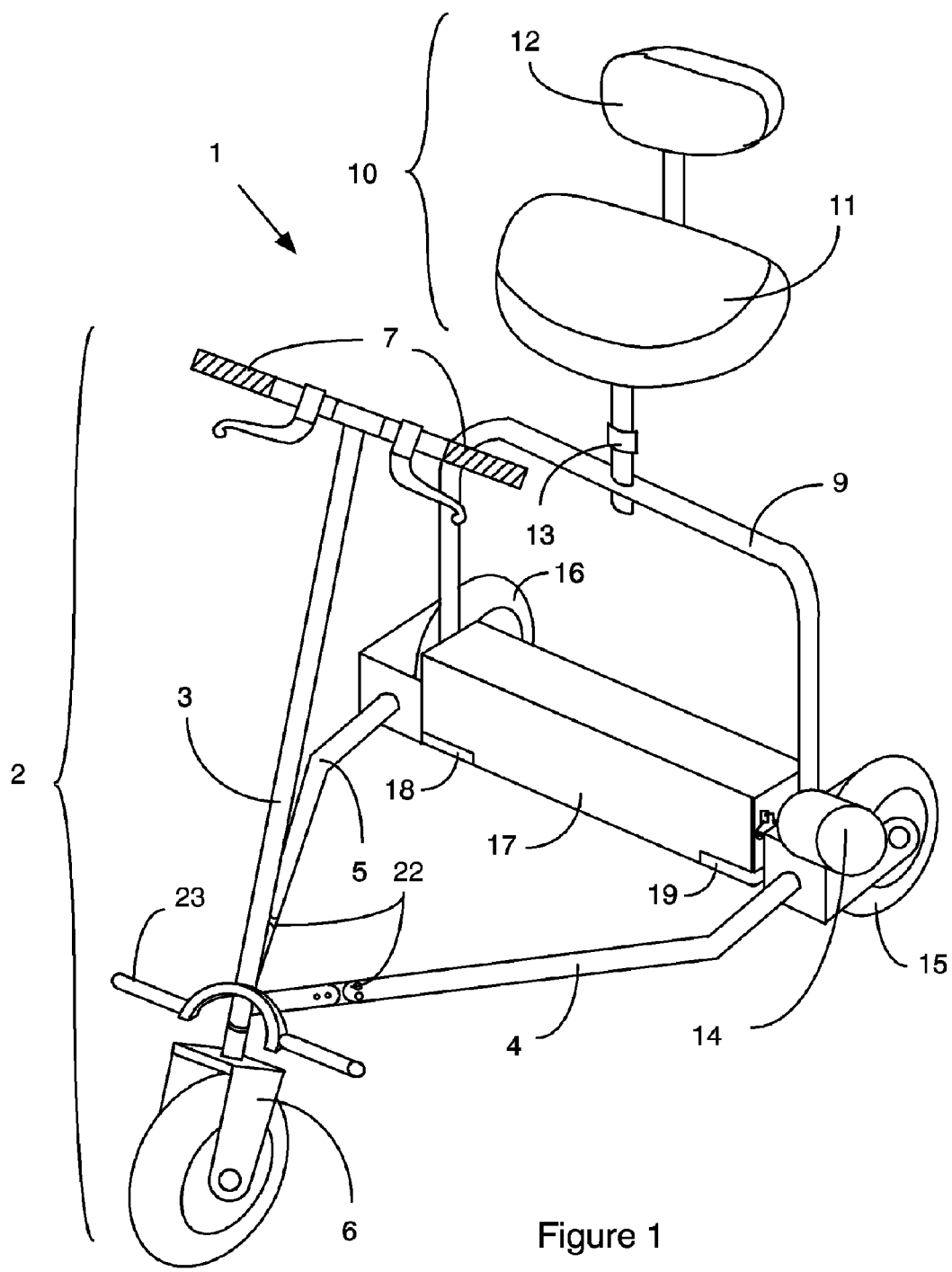
FIG. 1 is a perspective view of a preferred embodiment of the collapsible three wheeled vehicle in an operational configuration.

Prior to a detailed discussion of the figures, a general overview of the system will be presented. The invention provides an inexpensive collapsible three wheeled vehicle which provides mobility for an individual during use, and which disassembles and collapses such that it can be stored in a small storage bag for transportation or storage when not needed.

The vehicle includes a foldable central body which includes a steering column, foldable side rails, steering handles, and a detachable front wheel. During storage, the foldable side rails are moved to a folded position in which they are generally parallel with and adjoining the steering column. Detachable steering handles are secured to the top end of the steering column. During storage, the detachable steering handles are detached from the steering column and secured to the steering column such that they minimize the amount of space required to store them. At the bottom end of the steering column is a detachable front wheel. During storage, the detachable front wheel is removed from the steering column to minimize the amount of space required to store it. The ability to detach the front wheel and the steering handles from the steering column, provided with the ability to fold the side rails allows the foldable central body to be collapsed into the minimum amount of space required to store the three wheeled vehicle. As a result, the three wheeled vehicle can be transported in the smallest of automobiles, and stored in any small area which is convenient to the user. In fact, when used in combination with the optional storage bag, the entire vehicle can be placed inside the storage bag and carried in the same manner as a piece of ordinary luggage.

In addition to the components of the foldable central body which were discussed above, the foldable side rails each have a wheel at their distal ends. In addition, there is a motor drive assembly which is attached to one of the foldable side rails, and positioned such that it can apply a driving force to the wheel. Those skilled in the art will recognize that both of the wheels can have a motor drive assembly. However, it has been found that a single motor is more than capable of moving the vehicle.

In addition to the foldable central body, the three wheeled vehicle also has a few additional components. First, there is a removable support bracket which is secured to the distal ends of the foldable side rails during use. When the three wheeled vehicle is not in use, the removable support bracket is disconnected from the foldable side rails. The ability to disconnect the removable support bracket allows it to be stored in the most convenient manner, and with the minimum amount of required storage space.

The second component of the three wheeled vehicle is a removable seat assembly. The removable seat assembly is secured to the removable support bracket when the three wheeled vehicle is in use. When not in use, the removable seat assembly is detached from the removable support bracket to allow it to be stored most convenient manner. In the preferred embodiment, the removable seat assembly comprises a seat and an optional setback. To minimize the amount of space required to store the three wheeled vehicle, it is envisioned that the seat and optional setback can be detached from one another to further minimize the amount of storage required to store the three wheeled vehicle.

Another component of the three wheeled vehicle is a detachable battery power supply which rests on support extensions that extend from the distal end of the foldable side rails when they are in the unfolded position. Once the battery power supply is placed on the support extensions, it is secured to the removable support bracket. After the battery assembly is physically attached to the three wheeled vehicle, it is electrically connected to the motor and drive assembly via a conventional electrical connector. As was the case with the other components of the three wheeled vehicle, the battery power supply is intended to be removable to facilitate storage.

In addition to components of the three wheeled vehicle, an optional storage bag can be provided to hold the various components of the three wheeled vehicle when it is a transported or stored. Because of the collapsible nature of the three wheeled vehicle, all the components can be stored in the storage bag. In practice, the storage bag can be a reasonably small duffel bag, or other similar container or luggage device. The collapsible nature of the three wheeled vehicle provided herein provides a substantial advantage over the prior art because it eliminates all the storage and transportation problems associated with the bulk and weight of prior art wheelchairs and powered chairs.

The three wheeled vehicle is also more economical than powered wheelchairs or powered chairs due to its simplicity of construction. Further, it can be made from any suitable material having sufficient mechanical strength. For example, the various components of the invention can be made from metals such as steel, aluminum, etc., or alternatively, it can be made from the synthetic material, such as plastic, polyethylene, polypropylene, etc. The only requirement is that any material chosen for a particular component of the three wheeled vehicle should have sufficient mechanical strength for its intended purpose.

When the three wheeled vehicle is assembled for use, the detachable steering handles are inserted into the steering column and locked in place. In the preferred embodiment, commercially available spring loaded locks are used to secure the removable steering handles in place at the top end of the steering column. Then, the removable front wheel is attached to the bottom end of the steering column. Once the steering handles and front wheel are secured to the steering column, the foldable side rails are moved from the folded to the unfolded position. In the preferred embodiment, the foldable side rails are locked into position in the unfolded position with spring loaded locks. At this point, the central body is configured in the unfolded position and ready for attachment to the other components.

The next step is to place the battery power supply on support extensions which extend from the distal ends of each of the foldable side rails. The support extensions are shaped such that they provide platforms on which to rest the ends of the battery power supply, as well as small vertical extensions which prevent the battery power supply from sliding while the three wheeled vehicle is being driven.

Next, the removable support bracket is attached at its ends to the foldable side rails. Once attached, the removable support bracket is secured to the foldable side rails so that they cannot disengage. In addition, the battery power supply is also secured to the removable support bracket. In the preferred embodiment, the battery power supply is secured to the removable support bracket with hook and loop material. Those skilled in the art will recognize that the battery power supply can be secured to the removable support bracket via any suitable means. Further, for ease of discussion the battery was installed for a removable support bracket. However, the battery power supply can be installed before or after the remote or bracket.

The next step is to attach the seat assembly to the removable support bracket. In the preferred embodiment, the seat assembly is secured to the removable support bracket via a quick disconnect locking mechanism. However, as was the case above, any type of suitable securing means can be used so long as the seat assembly remains securely attached to the removable support bracket during use.

At this point, the three wheeled vehicle is now ready for use. Once the three wheeled vehicle is not needed, it is merely disassembled in the reverse order of assembly steps discussed above. Having discussed the features and advantages of the invention in general, we turn now to a more detailed discussion of the figures.

In FIG. 1, a preferred embodiment of the three wheeled vehicle 1 is shown. This figure illustrates the three wheeled vehicle 1 in the unfolded configuration where it is ready to transport an individual. Foldable central body 2 is shown attached to the other components of the three wheeled vehicle 1. Foldable central body 2 is comprised of the steering column 3, a detachable front wheel 6 which is attached to the lower end of the steering column 3, a pair of detachable steering handles 7 which are attached to the upper end of the steering column 3, a pair of footrests 23 which are attached near the lower end of the steering column 3, a pair of foldable side rails 4, 5 which are attached near the lower end of the steering column 3, a pair of wheels 15, 16 which are attached to the distal ends of the foldable side rails 4, 5, a motor drive assembly 14, and support extensions 18, 19. Also shown in this figure is removable support bracket 9 which is attached at either end to foldable side rails 4, 5. Battery power supply 17 rests on support extensions 18, 19, and is further secured to removable support bracket 9. Removable seat assembly 10 is the comprised of seat 11 and optional seat back 12. Removable seat assembly 10 is secured to removable support bracket 9 by seat lock 13.

In this unfolded configuration, foldable seat rails 4, 5 have been extended outward and away from steering column 3 by editing foldable seat rails 4, 5 at hinges 22 until they lock into position in the unfolded configuration. In the preferred embodiment, hinges 22 are locking hinges which retain the foldable side rails 4, 5 in the unfolded position, until they are released by the user.

To further stabilize the three wheeled vehicle 1, the removable support bracket 9 is locked in place near the distal ends of the foldable side rails 4, 5. Once locked into place, the three wheeled vehicle 1 has a rigid and stable structure. The battery power supply 17 is shown resting on support extensions 18, 19 which extend outward from the distal ends of the foldable side rails 4, 5. The support extensions 18, 19 provide support for the battery power supply 17, and in turn, the battery power supply 17 adds additional stability to the three wheeled vehicle 1. In addition to the support provided to battery power supply 17 by the support extensions 18, 19, battery power supply 17 is further secured by attaching it to the removable support bracket 9. In the preferred embodiment, battery power supply 17 is secured by hook and loop material. However those skilled in the art will recognize that any suitable method of securing battery power supply 17 to support bracket 9 can be used.

Motor drive assembly 14 is mechanically attached to wheel 15 to provide motive force when desired. Electrical energy is supplied to motor drive assembly 14 through electrical wires 21. Electrical connector 20 allows battery power supply 17 to be detached from motor drive assembly 14 so that it can be removed from the three wheeled vehicle 1.

As can be seen by this illustration, the three wheeled vehicle 1 has a minimal number of components. This provides several benefits. First, because it has only those components which are required to make the three wheeled vehicle 1 operational, the weight of the three wheeled vehicle 1 is relatively low. As a result, an individual can carry the device when it is placed in a storage container 24. This is a substantial advantage over prior art wheelchairs and powered chairs because they typically have greater weights.

In addition to its weight advantage, the fact that side rails 4, 5 can fold at hinges 22 allows the foldable central body 2 to be folded into a relatively compact area. Prior art devices, such as wheelchairs and powered chairs, do not have this ability and cannot be folded into a size as small as that provided by central body 2. In addition, by detaching detachable steering handles 7 and detachable front wheel 6, the foldable central body 2 can be stored in an even smaller area.

Another substantial advantage provided by this configuration is that it is relatively inexpensive to manufacture three wheeled vehicle 1 due to the simplicity of design and inexpensive nature of its components. Any suitable material can be used to manufacture three wheeled vehicle 1. It can be made from metals, such as steel or aluminum, or synthetics such as plastic, PVC, polyethylene, polypropylene, etc. Likewise, the wheels can be manufactured from any suitable material. Any battery technology can be used so long as it provides reasonable range and power. In the preferred embodiment, rechargeable batteries are used due to their economic benefit.

Figure 2:
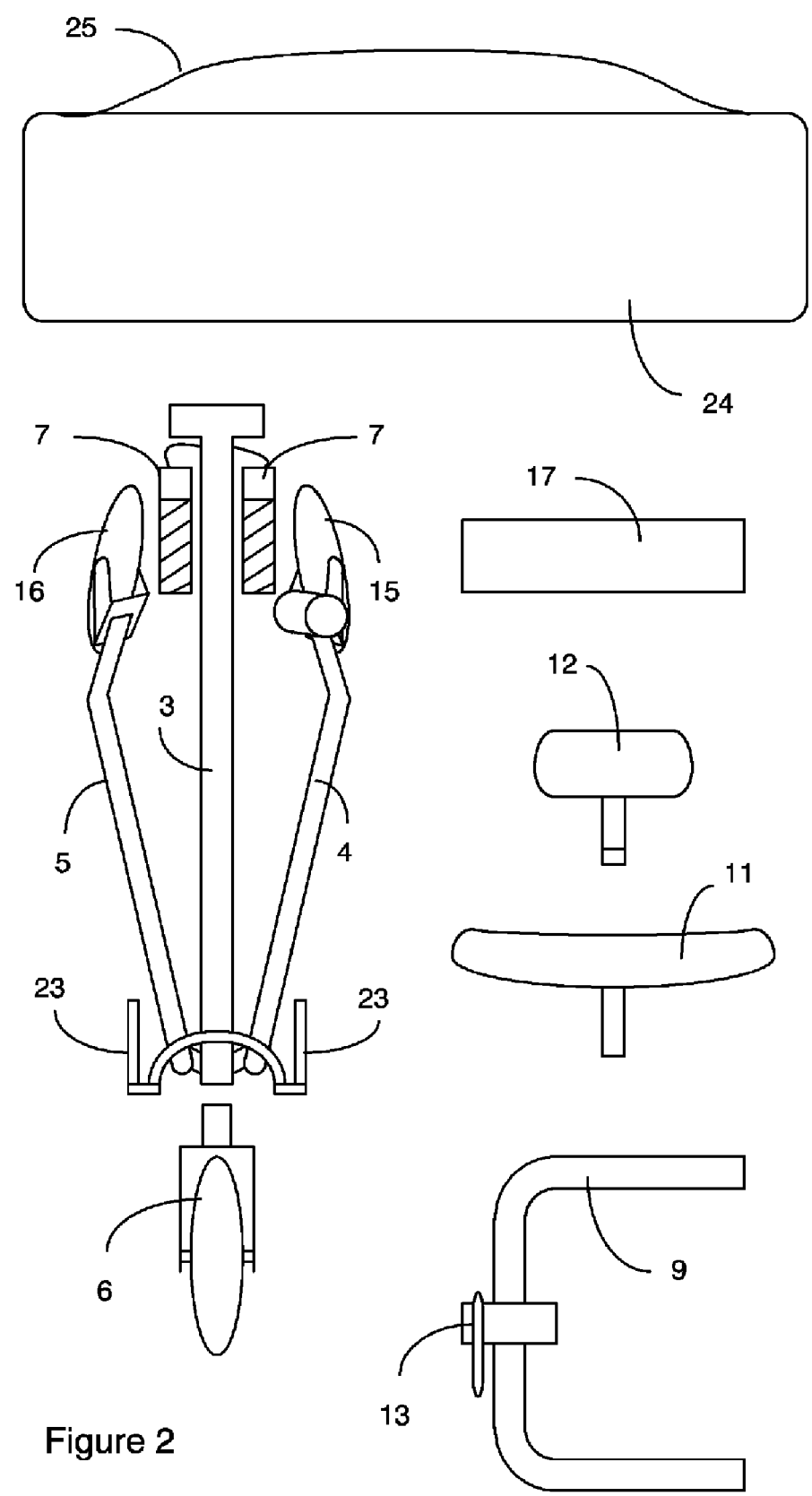
FIG. 2 illustrates the components of a preferred embodiment of the three wheeled vehicle and a storage container. The three wheeled vehicle is shown disassembled prior to being placed in the storage container for transport or storage.

FIG. 2 illustrates the components of a preferred embodiment of the three wheeled vehicle 1 and a storage container 24. The three wheeled vehicle 1 is shown disassembled prior to being placed in the storage container 24 for transport or storage. As can be seen from this figure, when foldable side rails 4, 5 are moved to the folded position, they are substantially parallel to steering column 3. This minimizes the amount of space for required to store the three wheeled vehicle 1. Further, detachable front wheel 6 is shown detached from steering column 3. By detaching the front wheel 6 from the steering column 3, the total amount of storage space required to store the three wheeled vehicle 1 is further reduced. Likewise, the detachable steering handles 7 have been detached steering column 3. This further reduces the required amount of space store the three wheeled vehicle 1. Also shown in this figure is battery power supply 17, seat back 12, seat 11, and removable support bracket 9. By detaching all of these components from one another, they can be more easily stored within storage bag 24. Once the collapsed three wheeled vehicle 1 is stored within storage bag 24, it can be carried by handle 25 in the same manner as an ordinary piece of luggage.

A benefit of the collapsible structure provided by the invention is that a motor driven vehicle can be provided for an individual when needed, and stored within a convenient carrying case when not needed. The prior art wheelchairs and powered chairs are not capable of providing a function such as this.

Figure 3:
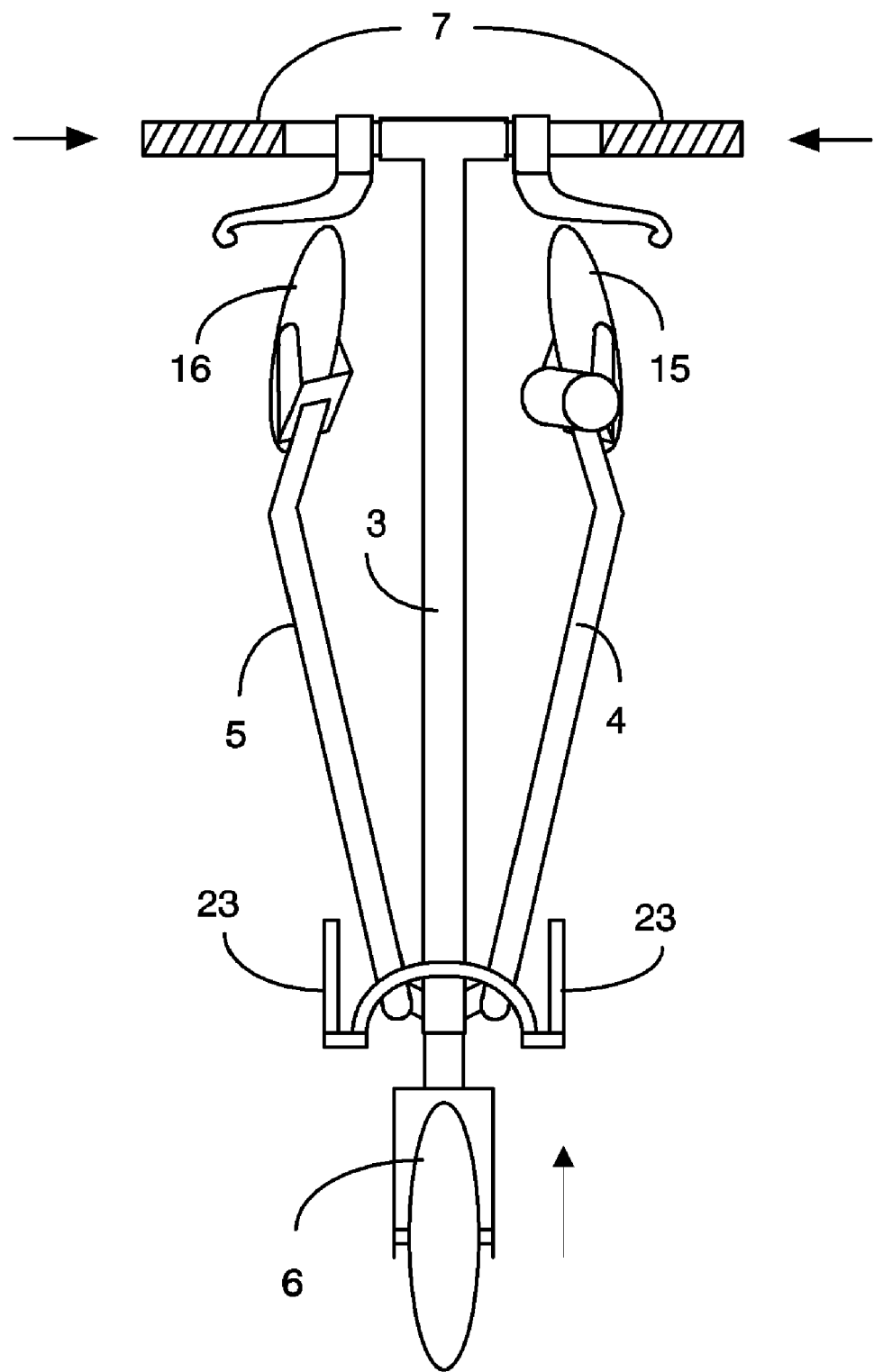
FIG. 3 illustrates a preferred embodiment of the three wheeled vehicle with a detachable front wheel being attached to steering column.

FIG. 3 illustrates a preferred embodiment of the three wheeled vehicle 1. In this figure, the three wheeled vehicle 1 is in the process of being assembled to permit it to be driven. As shown in this figure, the detachable front wheel 6 is being attached to steering column 3 by sliding it into the steering column 3 as indicated by the arrow. Likewise, the steering handles 7 have also been inserted into the steering column 3 as indicated by the arrows. In this figure, the foldable side rails 4, 5 remain in the folded position.

Figure 4:
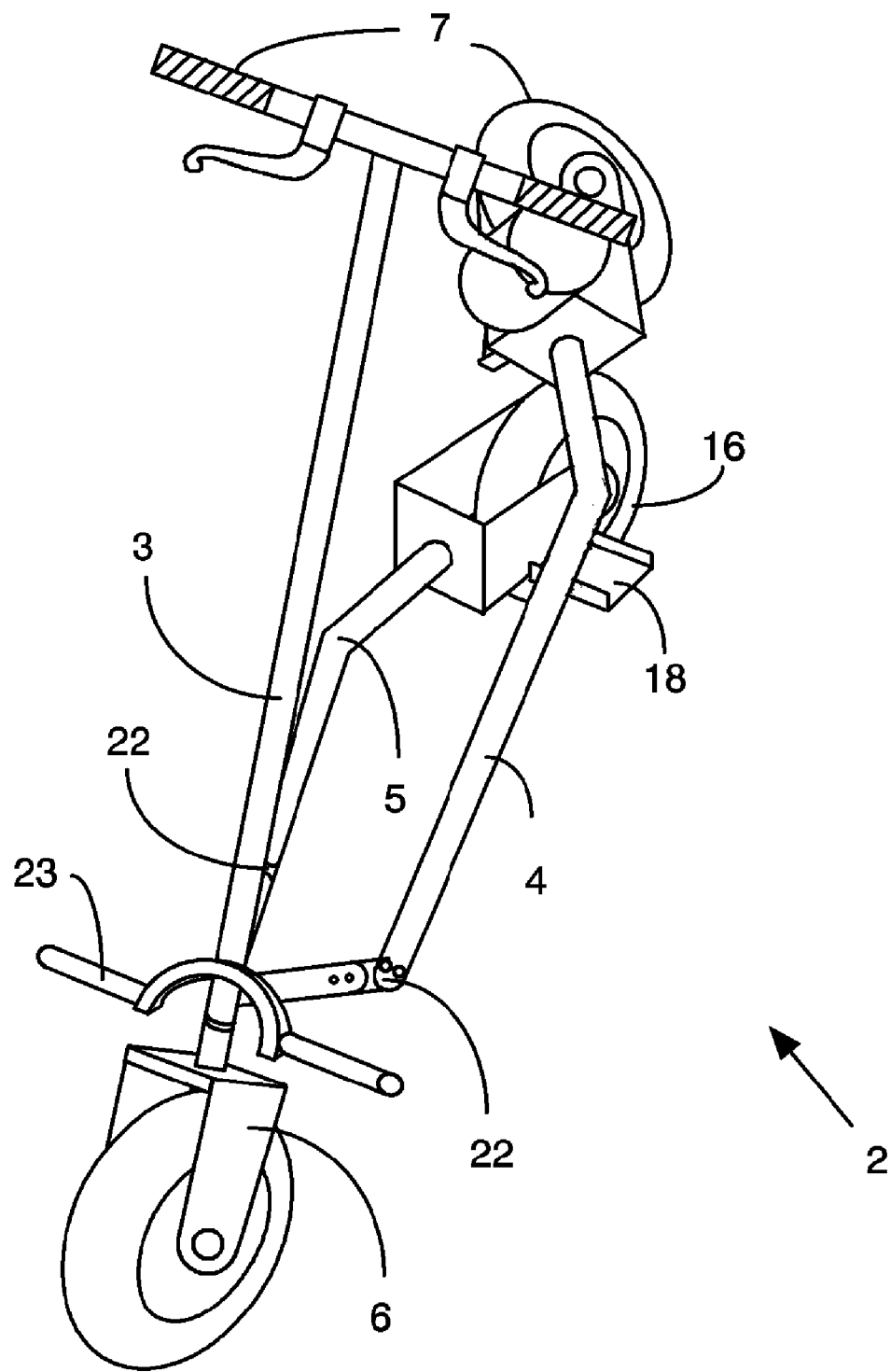
FIG. 4 illustrates a preferred embodiment of the three wheeled vehicle with a first foldable side rail moved to the unfolded position.

FIG. 4 illustrates a preferred embodiment of the three wheeled vehicle 1 with a first foldable side rail 5 moved to the unfolded position. The first foldable side rail 5 is moved to the unfolded position by rotating on hinge 22. Hinge 22 is designed to lock into place when it is put in the unfolded position. Any suitable locking mechanism can be used for this purpose. In the preferred embodiment, a commercially available spring loaded locking button is used. The second foldable side rail 4 remains in the folded position in this figure.

Figure 5:
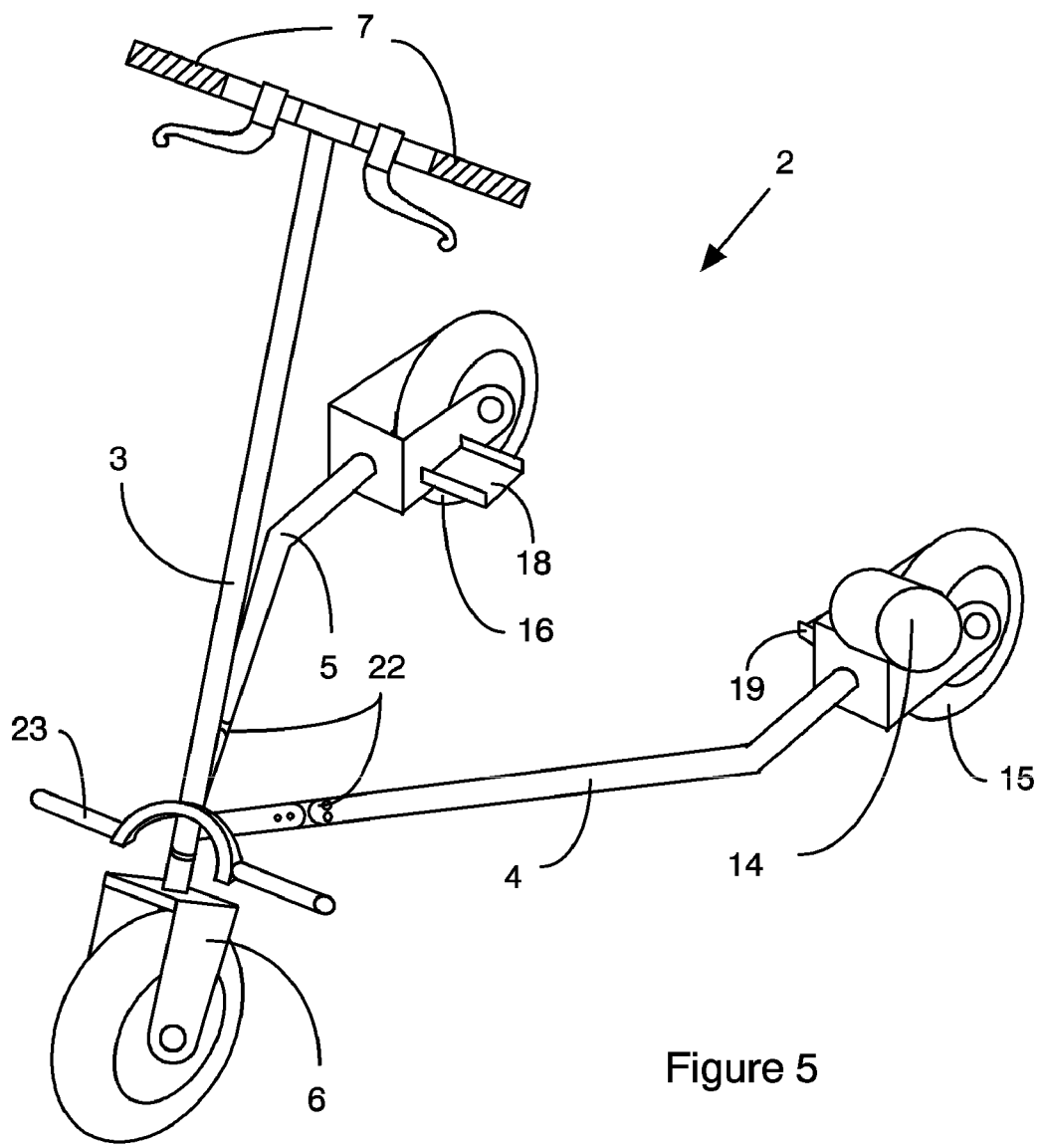
FIG. 5 illustrates a preferred embodiment of the three wheeled vehicle with a second foldable side rail moved to the unfolded position.

FIG. 5 illustrates a preferred embodiment of the three wheeled vehicle 1 with the second foldable side rail 4 moved to the unfolded position. In this position, both foldable side rails 4, 5 have been locked in the unfolded position and are ready for attachment to the remaining components.

Figure 6:
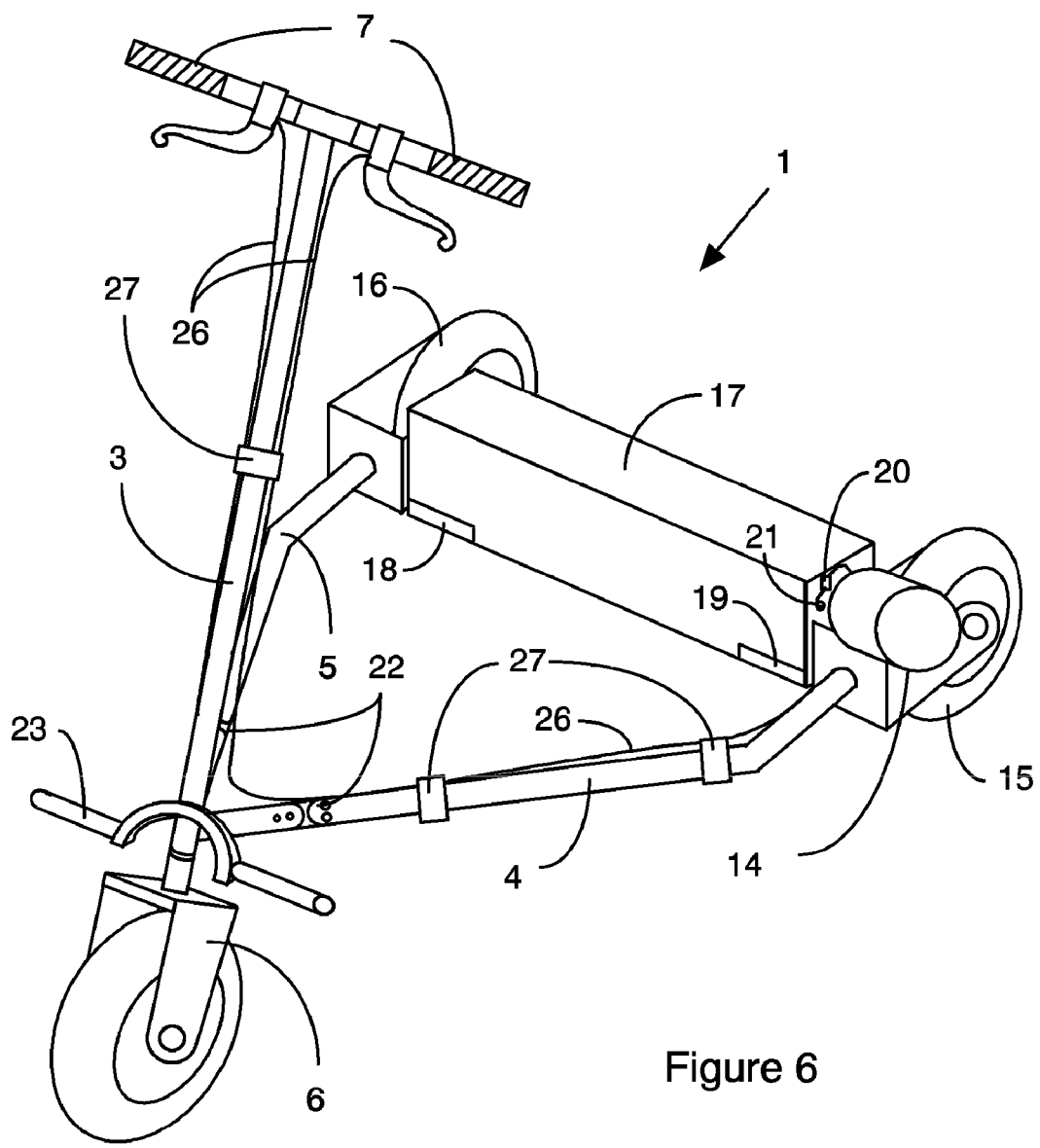
FIG. 6 illustrates a preferred embodiment of a battery power supply being placed between the two foldable side rails.

FIG. 6 illustrates a preferred embodiment of the three wheeled vehicle 1. In this step, the battery power supply 17 has been inserted between the two foldable side rails 4, 5, and rests on the support extensions 18, 19. Once the battery power supply 17 has been installed, it is electrically connected to motor assembly 14 via connector 20 and wires 21. Also shown this figure are control lines 26 which extend from the steering handles on the steering column 3 to motor assembly 14. The control lines 26 are held in place by retaining straps 27.

Figure 7:
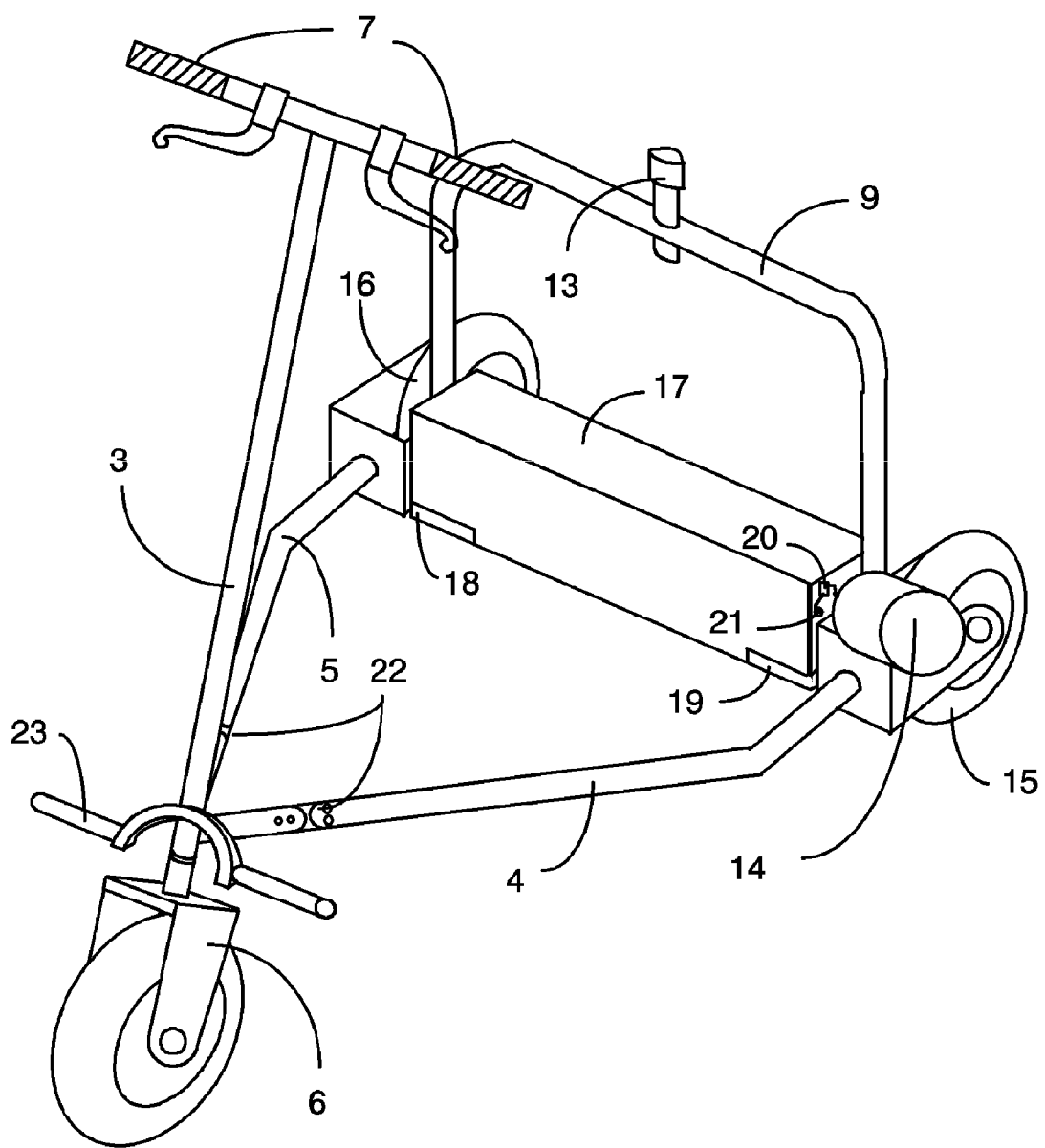
FIG. 7 illustrates a preferred embodiment of the removable support bracket being secured to the distal ends of the foldable side rails.

FIG. 7 illustrates a preferred embodiment of the three wheeled vehicle 1 after the removable support bracket 9 has been secured to the distal ends of the foldable side rails 4, 5. In the preferred embodiment, the removable support bracket 9 is inserted into corresponding sockets and secured via a locking mechanism. It is envisioned that commercially available levered cam locks be used to secure the removable support bracket 9 to the distal ends of the foldable side rails 4, 5. However, any suitable locking mechanism may be used. The only requirement is that once locked, the removable support bracket 9 should remain firmly engaged with the distal ends of the foldable side rails 4, 5.

Figure 8:
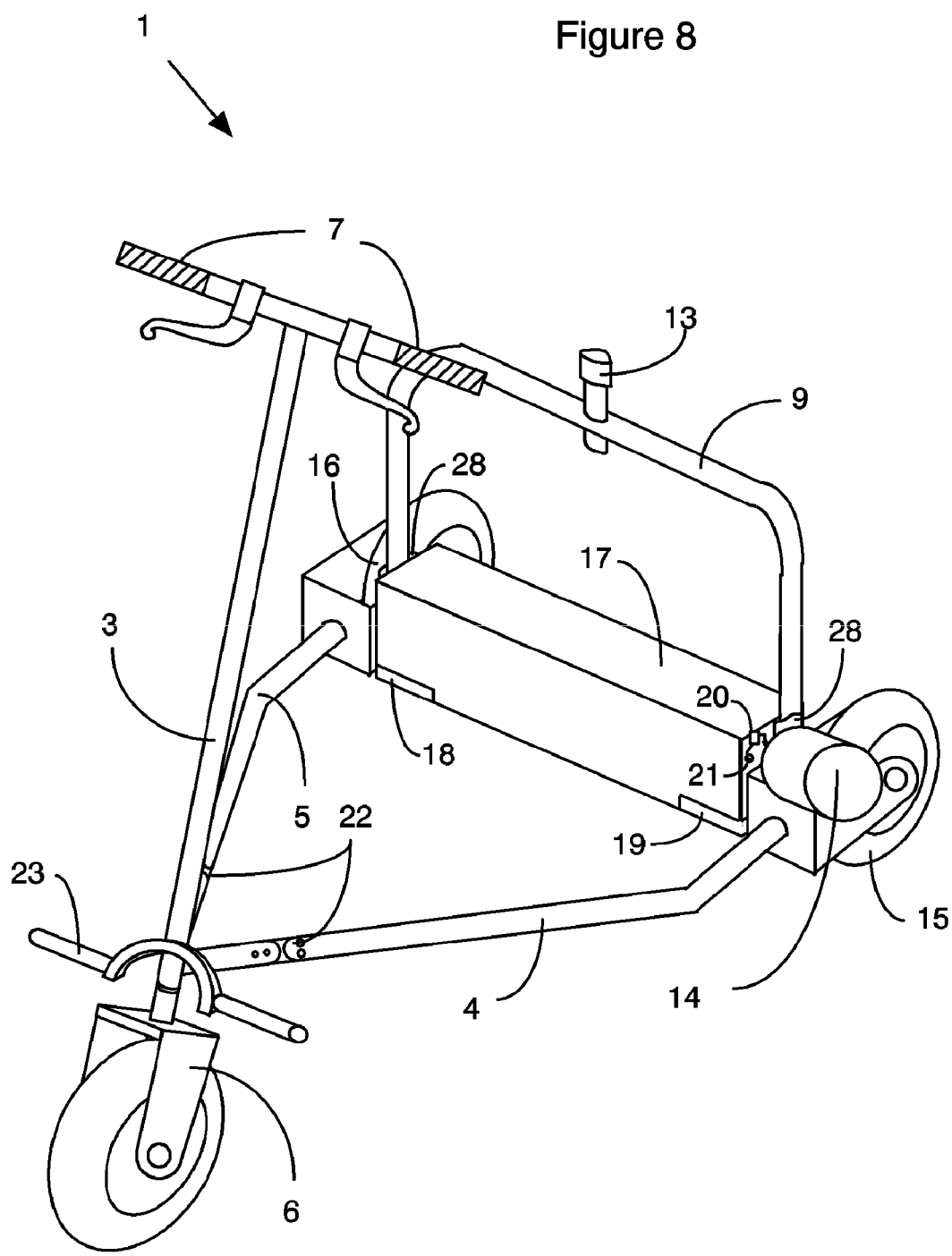
FIG. 8 illustrates a preferred embodiment of the battery power supply being secured to the removable support bracket.

FIG. 8 illustrates a preferred embodiment of the three wheeled vehicle 1 battery power supply 17 being secured to the removable support bracket 9. In the preferred embodiment, the battery power supply 17 has secured with hook and loop straps 28. However, those skilled in the art will recognize that any suitable method of securing the battery power supply 17 can be used.

Figure 9:
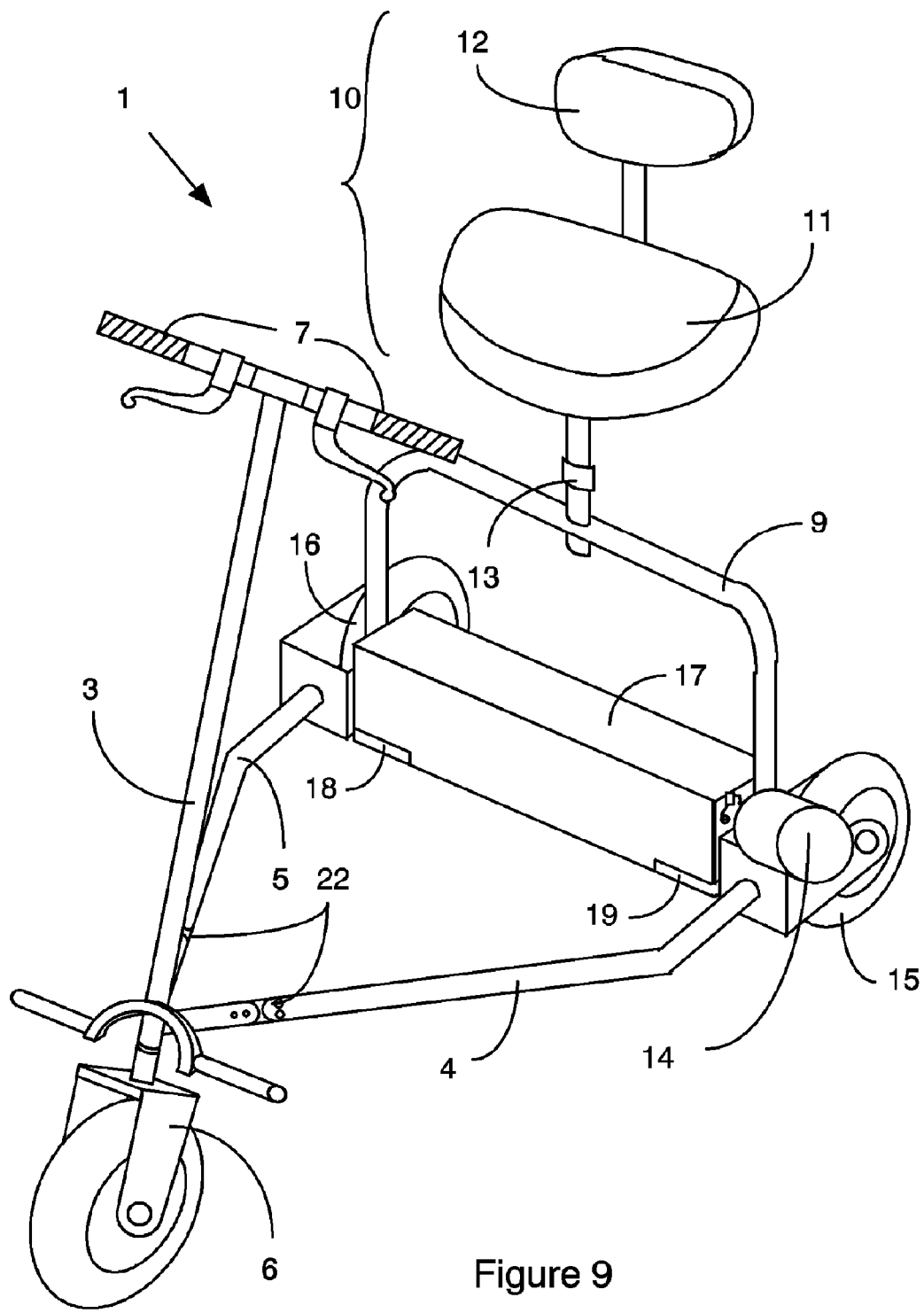
FIG. 9 illustrates a preferred embodiment of the seat assembly being secured to the removable support bracket.

FIG. 9 illustrates a preferred embodiment of the three wheeled vehicle 1 after the seat assembly 10 has been secured to the removable support bracket 9 by seat lock 13. At this point, the three wheeled vehicle 1 is completely assembled and ready for use. When the user decides that the three wheeled vehicle 1 is no longer needed, it can be disassembled using the above listed steps in reverse order.

As can be seen from this discussion, the three wheeled vehicle 1 can be very rapidly assembled for use, and when the use is finished, it can be very rapidly disassembled for storage and/or transport. When assembled, it is a full sized vehicle capable of comfortably transporting an individual. However, when it is not needed it can be rapidly collapse into a small area for storage and/or transport. This ability to collapse into a small size is a significant advantage of the invention over prior art wheelchairs and powered chairs which require substantial amounts of space, and are typically too heavy to carry when not in use. It is made possible because of the structural stability and rigidity provided by the removable support bracket 9 in combination with the foldable side rails 4, 5. In addition, because of its economy of design, it is possible to fabricate the three wheeled vehicle 1 inexpensively. This allows many individuals who cannot afford the expensive price of a wheelchair or a powered chair to have the freedom and ability to travel which was heretofore unavailable for them.

Figure 10:
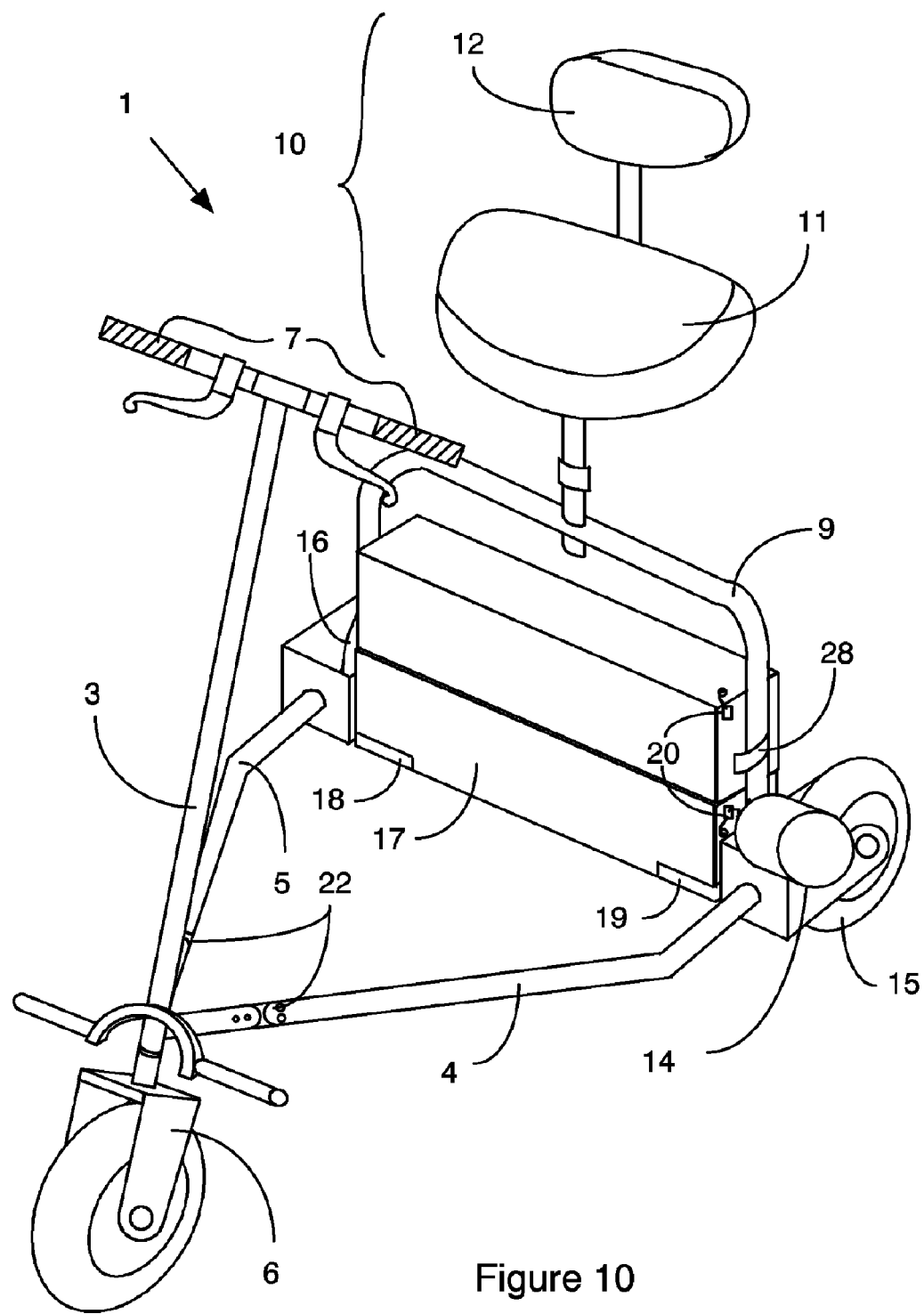
FIG. 10 illustrates a preferred embodiment of the three wheeled vehicle which shows an optional second battery power supply being secured to the removable support bracket.

FIG. 10 illustrates a preferred embodiment of the three wheeled vehicle 1 which shows an optional second battery power supply 17 being secured to the removable support bracket 9 via hook and loop straps 28. The optional second battery power supply 17 provides extended range for the individual, and more important, it avoids the situation where the individual is stranded due to a sudden unexpected loss of power. In the event that a battery power supply 17 needs to be changed, the user only needs to disconnect connector 20 from the battery power supply 17 which is currently in use, and then attach connector 20 from the fresh battery power supply 17 to the motor drive assembly 14. The optional second battery power supply 17 only adds a nominal amount of weight, but provides security and extended range for the individual.

Figure 11:
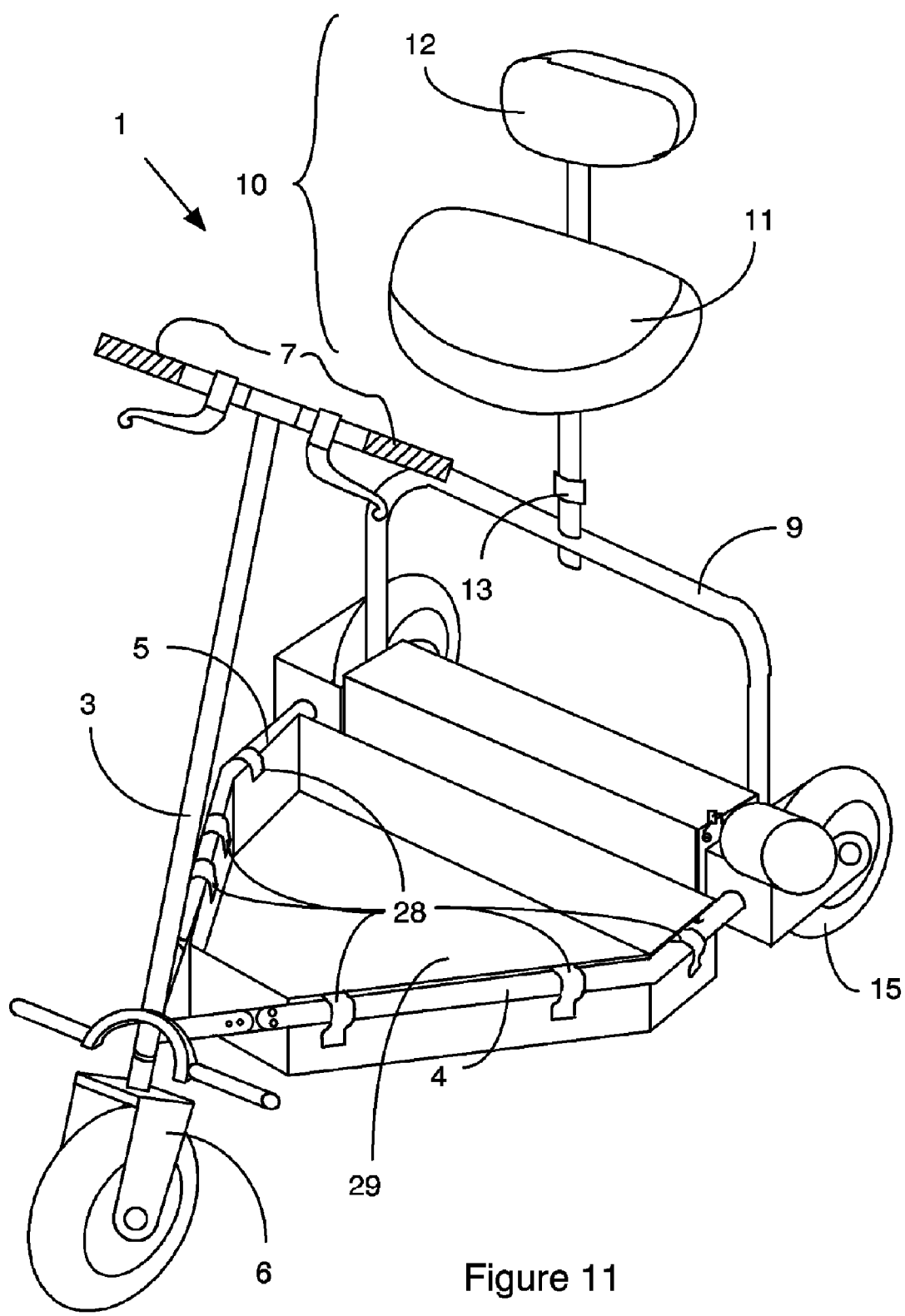
FIG. 11 illustrates an alternative preferred embodiment which includes an optional storage basket secured between the two foldable side rails.

FIG. 11 illustrates an alternative preferred embodiment of the three wheeled vehicle 1 which includes an optional storage basket 29 secured between the two foldable side rails 4, 5. In the preferred embodiment, storage basket 29 is secured to foldable side rails 4, 5 via hook and loop straps 28. Preferably, storage basket 29 is fabricated from a washable and flexible material to allow it to be cleaned with necessary, and to allow it to be folded for storage.

Figure 12:
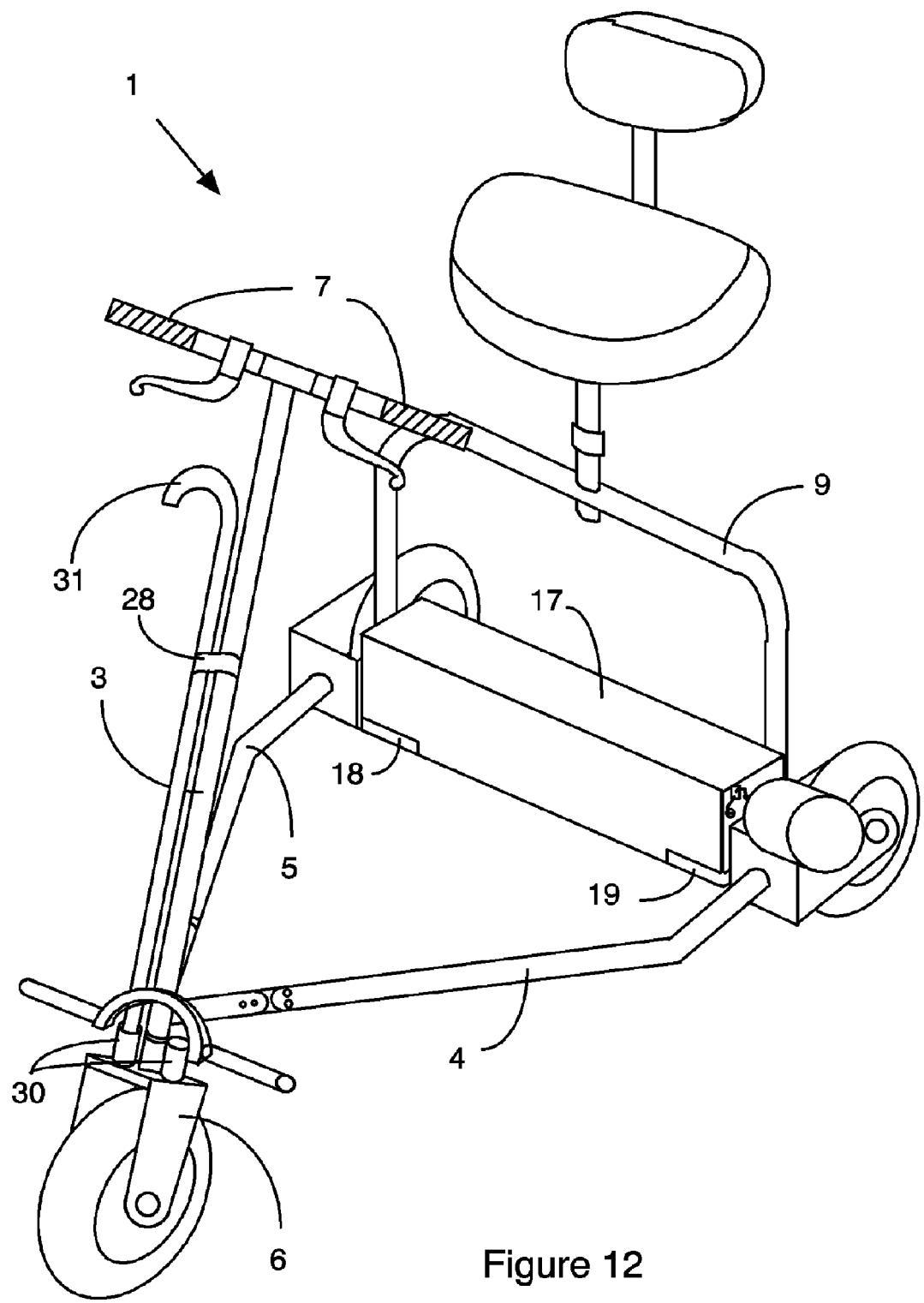
FIG. 12 illustrates another alternative preferred embodiment which includes a mounting assembly for securing a cane.

FIG. 12 illustrates another alternative preferred embodiment of the three wheeled vehicle 1 which includes a mounting assembly 30 for securing a cane 31. The mounting assembly 30 is a set of retaining cups designed to hold a foot of a cane, or the feet of a pair of crutches. When the individual prepares to drive the three wheeled vehicle 1, the cane 31 is secured by placing its foot into one of the retaining cups in the mounting assembly 30 and then securing the shaft of the cane 31 to the steering column 3 with a hook and loop strap 28. Once secured, the individual can drive the three wheeled vehicle 1 without having to be concerned about holding or maintaining control of the cane 31.

Figure 13:
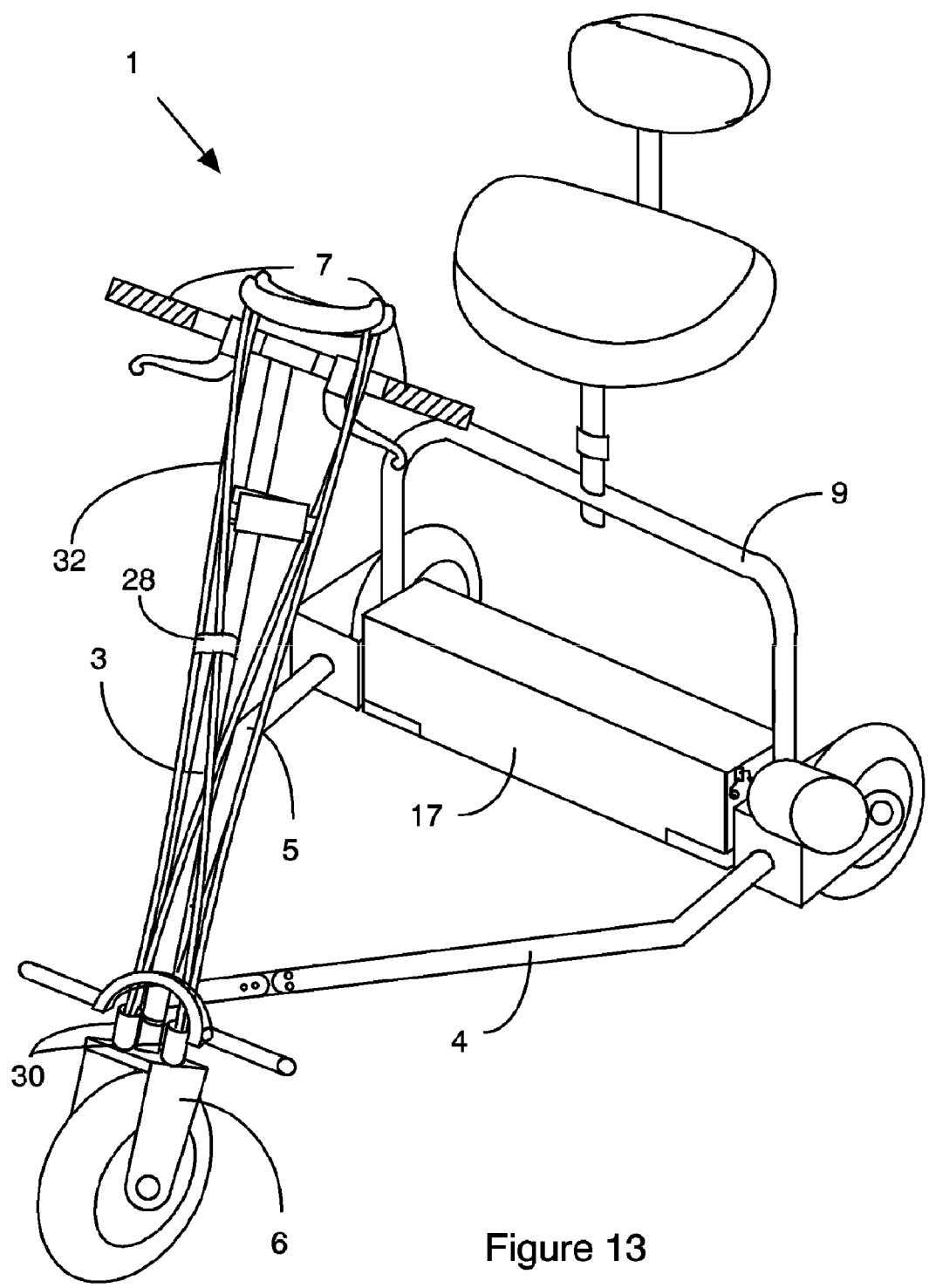
FIG. 13 illustrates the set of crutches secured by a mounting assembly.

FIG. 13 illustrates a set of crutches 32 secured to a preferred embodiment of the three wheeled vehicle 1. The crutches 32 are secured at their lower end by mounting assembly 30. In addition, a hook and loop strap 28 is used to secure the crutches 32 to the steering column 3.

As can be seen from the foregoing, the invention provides a three wheeled vehicle 1 suitable for use by disabled or elderly individuals the purpose of allowing them to travel and address daily chores. The device provides substantial advantages over the prior art. It is inexpensive to manufacture in comparison to prior art wheelchairs and powered chairs. Further, it can rapidly collapse into a very small size which allows it to be stored in a relatively small storage bag 24. This eliminates prior art problems related to storage constraints. In addition, because it can be collapsed into such a small size, it can be easily transported in even the smallest of vehicles. Further, the device is intended to be fabricated from lightweight tubing and other materials which will allow it to be carried if necessary. This is a feature not available with prior art vehicles. These advantages are brought about by a novel structural configuration which uses collapsible side rails 4, 5 in combination with a novel support bracket 9 which locks the side rails in place and simultaneously provides support for a seat assembly 13. The support bracket 9 secures the components of assistant together with a minimum number of pieces which results in minimum weight and cost.

For ease of discussion, the motor drive assembly 14 disclosed in this invention has been shown attached to one of the rear wheels. However, those skilled in the art will recognize that the motor drive assembly 14 can also be configured to attach to, and drive, the front wheel.

While the invention has been described with respect to a preferred embodiment thereof, it will be understood by those skilled in the art that various changes in detail may be made therein without departing from the spirit, scope, and teaching of the invention. For example, the material used to construct the three wheeled vehicle may be anything suitable for its purpose, the size and shape of the three wheeled vehicle, or components, such as the steering handles 7 or seat 10 can vary. The type and number of storage baskets 29 can vary, etc. Accordingly, the invention herein disclosed is to be limited only as specified in the following claims.

I claim:

1. A three wheeled vehicle, comprising:
   a steering column;
   a front wheel attached to the lower end of the steering column;
   steering handles attached to the upper end of the steering column;
   first and second foldable side rails hingedly attached at a proximal end to the steering column, the foldable side rails having a folded position and in unfolded position;
   each foldable side rail having a wheel attached at a distal end such that, when in the unfolded position, front wheel and the rear wheels each contact the surface on which the three wheeled vehicle rests;
   a support bracket, the support bracket having means to attach to the distal ends of the foldable side rails such that the foldable side rails and the support bracket form a rigid frame;
   a seat assembly attached to the support bracket; and
   a motor drive assembly attached to at least one of the rear wheels, or the front wheel.

2. A vehicle, as in claim 1, further comprising:
   a first battery power supply, electrically attached to the motor drive assembly; and
   means to control the application of power from the battery to the motor drive assembly.

3. A vehicle, as in claim 2, further comprising first and second opposing side extensions that extend toward one another when the side rails are in the unfolded position, the side extensions further providing a support for the battery.

4. A vehicle, as in claim 3, further comprising means to releasably secure the battery to the opposing side extensions.

5. A vehicle, as in claim 4, wherein the first opposing side extension is attached to the first side rail and the second opposing side extension is attached to the second side rail.

6. A vehicle, as in claim 4, wherein the opposing side extensions are attached to opposing ends of the support bracket.

7. A vehicle, as in claim 3, further comprising:
   a second battery power supply; and
   means to disconnect the first battery power supply from the motor drive assembly, and to electrically connect the second battery power supply to the motor drive assembly.

8. A vehicle, as in claim 7, further comprising means to releasably secure the first and second batteries to the vehicle.

9. A three wheeled vehicle, comprising:
   a steering column having a front wheel and steering handles;
   first and second foldable side rails, each having distal and proximal ends, hingedly attached to the steering column at their proximal ends, and movable from a folded position to an unfolded position;
   each distal end of the foldable side rail having a wheel attached to it; and
   a support bracket, the support bracket attached to the distal ends of the foldable side rails, the support bracket having a U-shape and sufficient rigidity sets that, when attached to the side rails, it forms a rigid frame which resists torsion which occurs during normal vehicle use.

10. A vehicle, as in claim 9, a wherein the support bracket is detachably attached to the distal ends of the foldable side rails such that, when attached, the foldable side rails and the support bracket form a rigid frame.

11. A three wheeled vehicle, comprising:
    a steering column having a front wheel and steering handles;
    first and second foldable side rails, each having distal and proximal ends, hingedly attached to the steering column at their proximal ends, and movable from a folded position to an unfolded position;
    each distal end of the foldable side rail having a wheel attached to it;
    a support bracket, the support bracket having means to attach to the distal ends of the foldable side rails such that the foldable side rails and the support bracket form a rigid frame;
    a support bracket, detachably attached to the distal ends of the foldable side rails such that, when attached, the foldable side rails and the support bracket form a rigid frame; and
    a motor drive assembly, operatively connected to at least one wheel.

12. A vehicle, as in claim 11, wherein the motorized drive assembly is power by a battery.

13. A vehicle, as in claim 11, further comprising:
    a seat assembly; and
    means to removably attach the seat assembly to the support bracket.

14. A vehicle, as in claim 12, further comprising first and second opposing side extensions that extend toward one another when the side rails are in the unfolded position, the side extensions further providing a support for the battery.

15. A vehicle, as in claim 14, further comprising means to releasably secure the battery to the opposing side extensions.

16. A vehicle, as in claim 14, wherein the first opposing side extension is attached to the first side rail and the second opposing side extension is attached to the second side rail.

17. A vehicle, as in claim 14, wherein the opposing side extensions are attached to opposing ends of the support bracket.

18. A vehicle, as in claim 12, further comprising:
    a second battery power supply;
    means to disconnect the first battery power supply from the motor drive assembly, and
    means to electrically connect the second battery power supply to the motor drive assembly.

19. A vehicle, as in claim 18, further comprising means to releasably secure the first and second batteries to the vehicle.

20. A vehicle, as in claim 11, further comprising a storage bag sized such that when the vehicle is disassembled and folded for storage, its component parts are enclosed by and fit snugly and securely within the storage bag.

* * * * *